US012565091B2

(12) United States Patent
Tan et al.

(10) Patent No.: US 12,565,091 B2
(45) Date of Patent: Mar. 3, 2026

(54) VEHICLE AND BATTERY PACK THEREOF

(71) Applicant: BYD COMPANY LIMITED, Shenzhen (CN)

(72) Inventors: Liangwen Tan, Shenzhen (CN); Peng Lu, Shenzhen (CN); Na Song, Shenzhen (CN); Jing Tan, Shenzhen (CN); Wenhui Chen, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 601 days.

(21) Appl. No.: 18/079,335

(22) Filed: Dec. 12, 2022

(65) Prior Publication Data

US 2023/0112735 A1 Apr. 13, 2023

Related U.S. Application Data

(63) Continuation of application No. PCT/CN2021/089035, filed on Apr. 22, 2021.

(30) Foreign Application Priority Data

Jun. 19, 2020 (CN) .......................... 202010578306.0

(51) Int. Cl.
B60K 1/04 (2019.01)
H01M 10/42 (2006.01)
(Continued)

(52) U.S. Cl.
CPC ............. B60K 1/04 (2013.01); H01M 10/425 (2013.01); H01M 10/613 (2015.04);
(Continued)

(58) Field of Classification Search
CPC .............. B60K 1/04; B60K 2001/0038; B60K 2001/0455; H01M 50/289; H01M 10/613;
(Continued)

(56) References Cited

U.S. PATENT DOCUMENTS

| | | | |
|---|---|---|---|
| 5,625,271 A | 4/1997 | Shapiro et al. | |
| 12,351,013 B2 * | 7/2025 | Klomberg | .............. B62D 25/20 |

(Continued)

FOREIGN PATENT DOCUMENTS

| | | |
|---|---|---|
| CN | 204333155 U | 5/2015 |
| CN | 205564850 U | 9/2016 |

(Continued)

OTHER PUBLICATIONS

International Search Report and Written Opinion for Application No. PCT/CN2021/089035, mailed on Jul. 26, 2021, 13 pages.

*Primary Examiner* — Jason D Shanske
*Assistant Examiner* — James J Triggs
(74) *Attorney, Agent, or Firm* — Sheppard Mullin Richter & Hampton LLP

(57) ABSTRACT

A battery pack includes a tray, multiple batteries, a distribution box, and a sealing plate. The tray includes an accommodating space, and the batteries and the distribution box are disposed in the accommodating space. The batteries are electrically connected to the distribution box. The tray includes a bottom plate, an access port in communication with the accommodating space is provided on the bottom (Continued)

plate, and the access port is disposed opposite to the distribution box. The sealing plate covers the access port, and the sealing plate is detachably connected to the bottom plate.

16 Claims, 3 Drawing Sheets

(51) Int. Cl.
| | |
|---|---|
| *H01M 10/613* | (2014.01) |
| *H01M 10/6554* | (2014.01) |
| *H01M 50/204* | (2021.01) |
| *H01M 50/244* | (2021.01) |

(52) U.S. Cl.
CPC ..... *H01M 10/6554* (2015.04); *H01M 50/204* (2021.01); *H01M 50/244* (2021.01); *B60K 2001/0405* (2013.01); *H01M 2220/20* (2013.01)

(58) Field of Classification Search
CPC ............. H01M 50/244; H01M 50/204; H01M 2220/20; H01M 50/55; H01M 50/186; H01M 50/209; B60R 16/04
See application file for complete search history.

(56) References Cited

U.S. PATENT DOCUMENTS

| | | | | |
|---|---|---|---|---|
| 2012/0160584 A1* | 6/2012 | Nitawaki | ................. | B60K 1/04 |
| | | | | 180/68.5 |
| 2019/0229309 A1* | 7/2019 | Newman | ............. | H01M 50/271 |

FOREIGN PATENT DOCUMENTS

| | | | |
|---|---|---|---|
| CN | 207409572 U | 5/2018 |
| CN | 208000958 U | 10/2018 |
| CN | 109786596 A | 5/2019 |
| CN | 209200099 U | 8/2019 |
| CN | 210006806 U | 1/2020 |
| CN | 210200815 U | 3/2020 |
| CN | 211789350 U | 10/2020 |
| EP | 3580078 B1 | 4/2020 |
| KR | 20170024842 A | 3/2017 |
| WO | 2006030659 A1 | 3/2006 |

* cited by examiner

VEHICLE AND BATTERY PACK THEREOF

CROSS-REFERENCE TO RELATED APPLICATIONS

This application is a continuation application of International Patent Application No. PCT/CN2021/089035 filed with the China National Intellectual Property Administration (CNIPA) on Apr. 22, 2021, which is based on and claims priority to and benefits of Chinese Patent Application No. 202010578306.0, filed on Jun. 19, 2020. The entire content of all of the above-identified applications is incorporated herein by reference.

FIELD

The present disclosure relates to the field of battery technologies, and more specifically to a vehicle and a battery pack thereof.

BACKGROUND

An access port in an existing battery pack is arranged on the top of the battery pack. The battery pack is mounted in a battery pack mounting position of a vehicle. The top of the battery pack is accommodated inside the mounting position (the access port is covered by a vehicle body). When a distribution box of the battery pack fails, the entire battery pack needs to be removed from the vehicle body before the distribution box can be serviced through the access port, resulting in low service efficiency and high service cost.

SUMMARY

The present disclosure resolves at least one of the technical problems in the prior art. For this, the present disclosure provides a battery pack. The battery pack has high service efficiency and low service cost.

The present disclosure relates to a battery pack, which includes a tray, multiple batteries, a distribution box, and a sealing plate. The tray includes an accommodating space, and the batteries and the distribution box are disposed in the accommodating space. The batteries are electrically connected to the distribution box. The tray includes a bottom plate, an access port in communication with the accommodating space is provided on the bottom plate, and the access port is disposed opposite to the distribution box. The sealing plate covers the access port, and the sealing plate is detachably connected to the bottom plate.

A vehicle includes a vehicle body and the foregoing battery pack. An outer surface of the vehicle body includes a first mounting position, and the battery pack is fixed in the first mounting position. Or, an outer surface of a bottom of the vehicle body includes a second mounting position, and the battery pack is fixed in the second mounting position.

Other aspects and advantages of the present disclosure are given in the following description, some of which become apparent from the following description or may be learned from practices of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
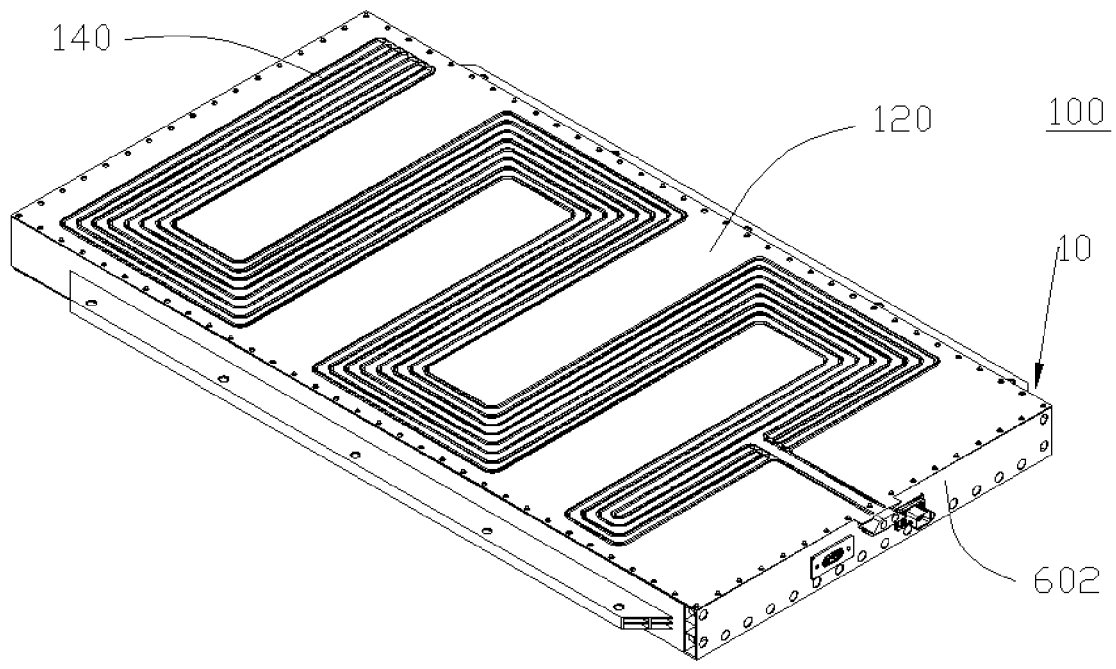
FIG. 1 is a schematic structural diagram of a battery pack according to an embodiment of the present disclosure.

Embodiments of the present disclosure are described in detail below, and examples of the embodiments are shown in accompanying drawings, where the same or similar elements or the elements having same or similar functions are denoted by the same or similar reference numerals throughout the description. The embodiments that are described with reference to the accompanying drawings are exemplary, and are only used to interpret the present disclosure, instead of limiting the present disclosure.

It needs to be noted that the terms "first" and "second" are used for descriptive purposes only and should not be construed as indicating or implying relative importance or implicitly indicating the number of technical features indicated. Therefore, features defining "first" and "second" may explicitly or implicitly include one or more such features. Further, in the description of the present disclosure, unless stated otherwise, the meaning of "multiple" is two or more than two.

The present disclosure provides a vehicle 1000, which includes a vehicle body and a battery pack 100. A mounting position is arranged on an outer surface of the vehicle body. The battery pack 100 is fixed in the mounting position by a side beam 60 of a tray 10. It may be understood that the mounting position may be a groove. The battery pack 100 is mounted in the groove.

Figure 2:
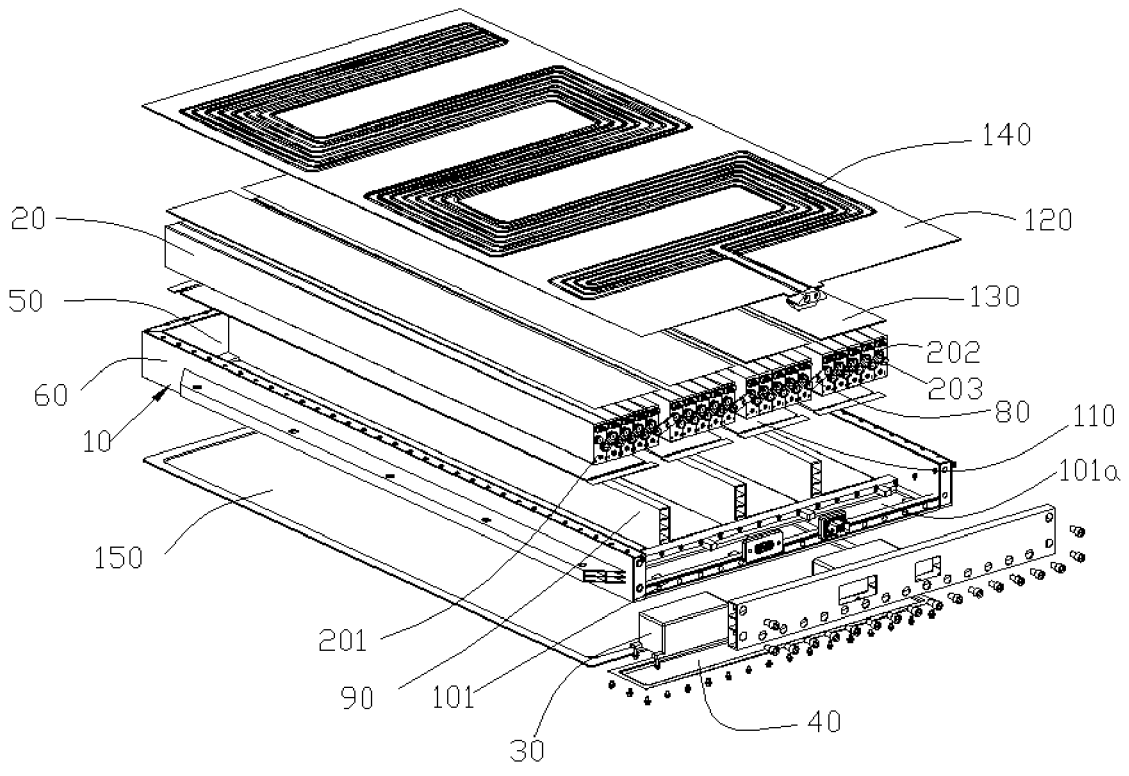
FIG. 2 is a schematic structural exploded view of the battery pack in FIG. 1.
Figure 3:
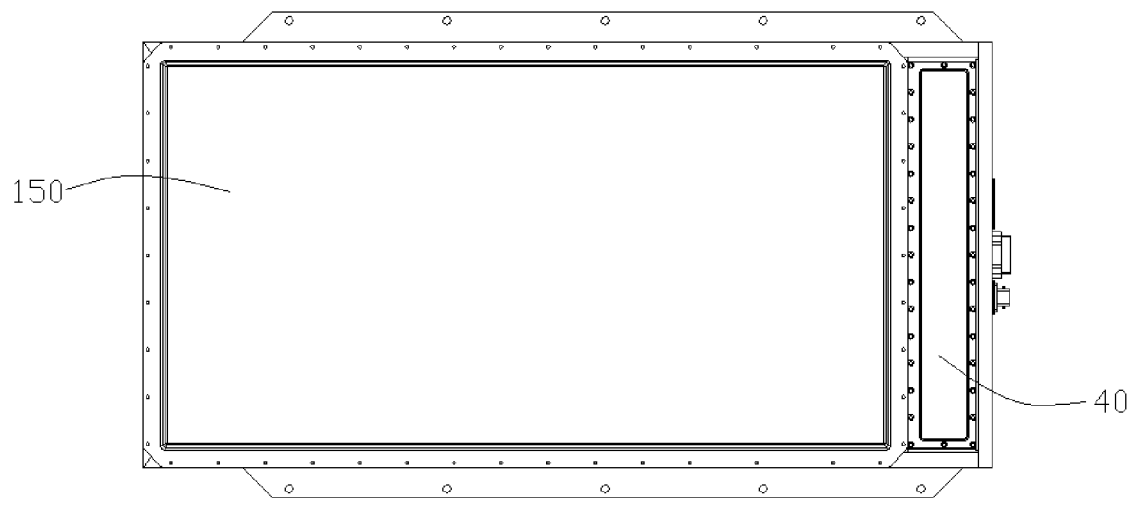
FIG. 3 is a schematic structural bottom view of the battery pack in FIG. 1.

Referring to FIG. 1 to FIG. 3, the battery pack 100 includes the tray 10, multiple batteries 20, a distribution box 30, and a sealing plate 40. An accommodating space 50 is formed in the tray 10. The multiple batteries 20 and the distribution box 30 are accommodated or disposed in the accommodating space 50. All of the multiple batteries 20 are electrically connected to the distribution box 30. The tray 10 includes a bottom plate 101. An access port 101a in communication with the accommodating space 50 is provided on the bottom plate 101 corresponding to the distribution box 30. The sealing plate 40 seals the access port 101a. The sealing plate 40 is detachably connected to the bottom plate 101. It may be understood that circuit protection parts such as a maintenance switch and a fuse are included in the distribution box 30. The service of the battery pack 100 by the after-sales service may need to operate the distribution box 30. The access port 101a in the battery pack 100 is used to operate the distribution box 30 by the after-sales service. The sealing plate 40 is detachably connected to the bottom plate 101 by a bolt. The battery pack 100 further includes a protection plate 150. The protection plate 150 is stacked with the bottom plate 101. The protection plate 150 is arranged on a side of the bottom plate 101 away from the accommodating space 50 to expose the access port 101a.

Therefore, when the distribution box of the battery pack fails, it is only necessary to lift a vehicle, and a technician can service the distribution box under the vehicle. A disassembly procedure of the battery pack can be eliminated, so that the service cost can be reduced and the service efficiency can be improved.

It may be understood that the bottom plate 101 of the battery pack 100 is an independent plate. That is, the bottom plate 101 of the battery pack 100 is not connected to the vehicle body. The bottom plate 101 of the battery pack 100 is not covered by the vehicle body. The access port 101a is not covered by the vehicle body.

In this way, when the distribution box 30 of the battery pack 100 fails, it is only necessary to disassemble the sealing plate 40. The distribution box 30 is serviced through the access port 101a in the bottom plate 101. It is not necessary to disassemble battery pack 100, so that the service efficiency is high, thereby resolving the technical problem that when the access port 101a in the battery pack 100 is arranged at the top, it has to disassemble the entire battery pack 100 from the vehicle body to service the distribution box 30 through the access port at the top, resulting in low service efficiency and high service cost.

In some embodiments, the mounting position is arranged on an outer surface of a bottom of the vehicle body. The battery pack 100 is fixed in the mounting position at the bottom. When the battery pack 100 is mounted in the mounting position at the bottom of the vehicle 1000, the bottom plate 101 of the battery pack 100 faces downward. That is, when the vehicle 1000 is in a normal running state or stopped state, the bottom plate 101 of the battery pack 100 faces the ground.

In this case, when the distribution box 30 of the battery pack 100 fails, it is only necessary to lift the vehicle 1000, and a technician can service the distribution box 30 under the vehicle. A disassembly procedure of the battery pack 100 is eliminated.

Figure 4:
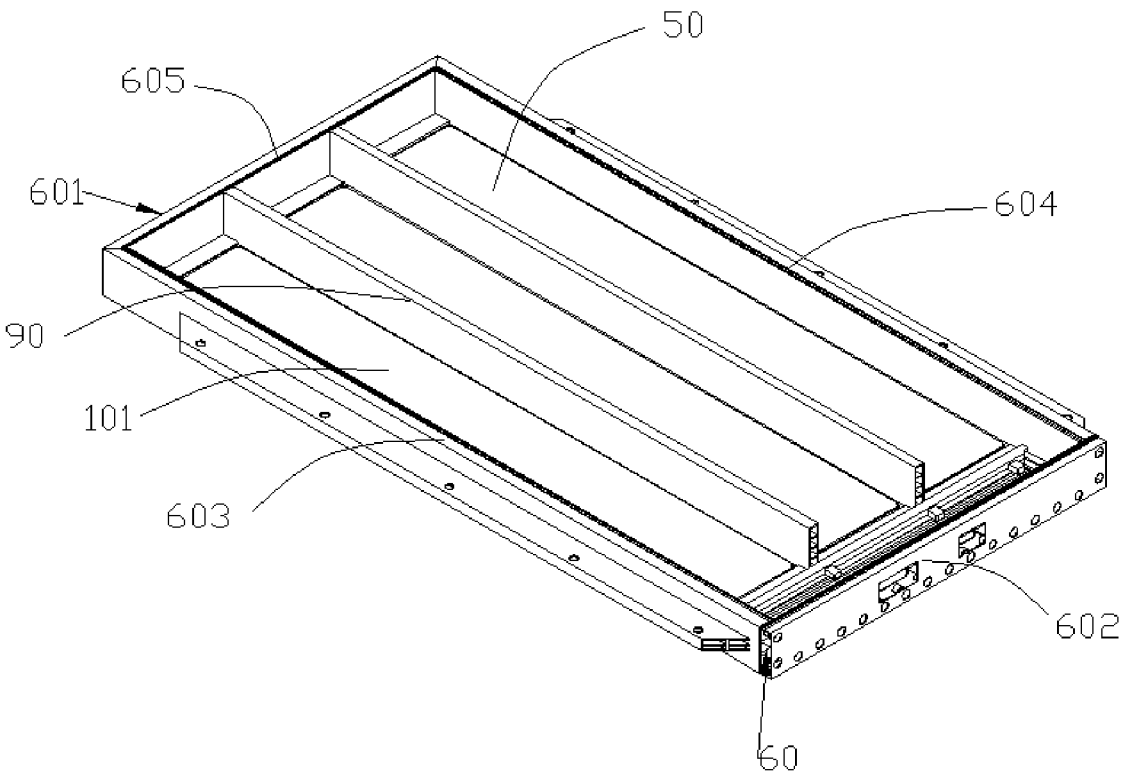
FIG. 4 is a schematic structural diagram of a tray in FIG. 1.
Figure 5:
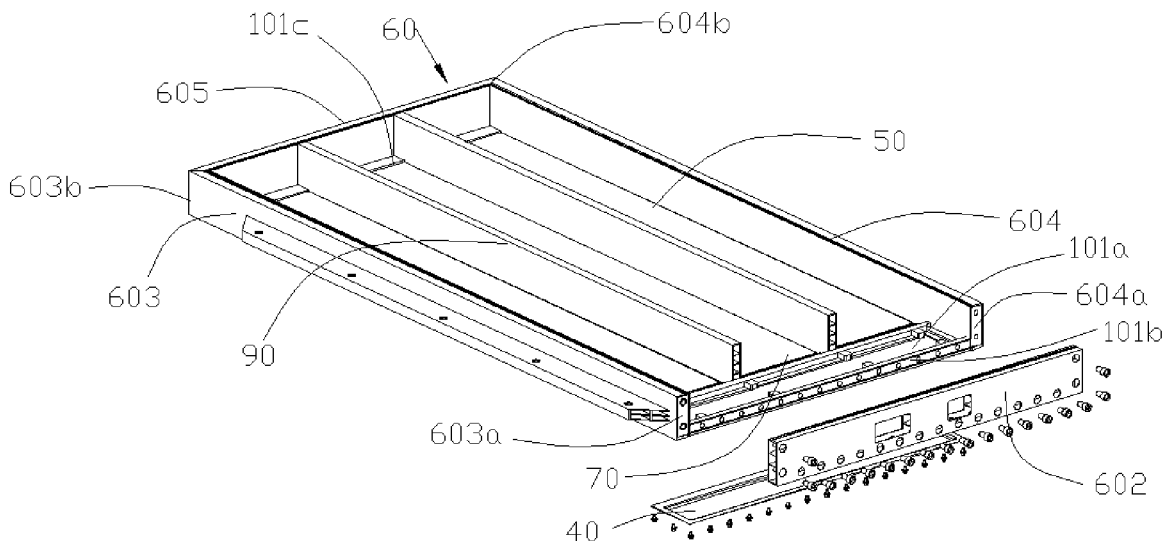
FIG. 5 is a schematic structural exploded view of the tray in FIG. 4.

Referring to FIG. 4 and FIG. 5 together, the tray 10 further includes a side beam 60. The side beam 60 is connected to the bottom plate 101 to form the accommodating space 50. The height of the side beam 60 is greater than or equal to the height of the batteries 20. In this case, through the arrangement of the side beam 60, the batteries 20 in the accommodating space 50 can be protected, thereby avoiding the technical problem that when the battery pack 100 is subjected to a lateral collision during travel, the batteries 20 are prone to short circuit caused by compression. In addition, the arrangement of the side beam 60 also increases the compression resistance of the tray 10. In addition, because the height of the side beam 60 is greater than or equal to the height of the batteries 20, the side beam 60 may completely wrap the batteries 20. The batteries 20 are completely kept from the impact of external collision. It may be understood that the side beam 60 may be arranged at an edge of the bottom plate 101 to allow a large volume of the accommodating space 50, so that more batteries 20 can be placed in the large accommodating space 50.

The side beam 60 includes a primary side beam 601 and a secondary side beam 602. An opening 70 is provided in the primary side beam 601. The opening 70 is in communication with the accommodating space 50. The secondary side beam 602 covers the opening 70. The secondary side beam 602 is detachably connected to the primary side beam 601, so that the primary side beam 601 can be easily connected to the secondary side beam 602 and easily detached. The side beam 60 has a split-type structure. An adhesive overflow groove is provided on a surface of a connection between the primary side beam 601 and the secondary side beam 602. The primary side beam 601 is bonded to the secondary side beam 602 by a sealing adhesive. In addition, after the primary side beam 601 is bonded and fixed to the secondary side beam 602, the primary side beam 601 and the secondary side beam 602 may be further fastened by a bolt.

The battery pack 100 further includes multiple connection sheets 80. Each battery 20 includes a top surface 201. The top surface 201 faces the opening 70. A positive terminal 202 and a negative terminal 203 are arranged at an interval (e.g., separated by a distance) on the top surface 201 of each battery 20. Each connection sheet 80 is arranged between adjacent batteries 20. The connection sheet 80 is used for electrically connecting the positive terminal 202 of one of the two adjacent batteries to the negative terminal 203 of the other one of the two adjacent batteries.

The multiple batteries 20 are arranged in an array in the accommodating space 50. The top surface 201 of each battery 20 faces the opening 70. Both the positive terminal 202 and the negative terminal 203 face the opening 70. The arrangement of the opening 70 facilitates the connection between the connection sheets 80 and terminals (the positive terminals 202 and/or the negative terminals 203). In the present disclosure, the connection sheet 80 is used for electrically connecting the positive terminal 202 of one of the two adjacent batteries to the negative terminal 203 of the other one of the two adjacent batteries through welding. In an embodiment, another connection manner may be used. Each of the multiple connection sheets 80 electrically connects the positive terminal 202 of one of the two adjacent batteries to the negative terminal 203 of the other one of the two adjacent batteries to connect the multiple batteries 20 in series.

In the present disclosure, the secondary side beam 602 is detachably connected to the primary side beam 601. When the secondary side beam 602 is detached from the primary side beam 601 or the secondary side beam 602 is not mounted on the primary side beam 601, the opening 70 in the primary side beam 601 may be exposed. After multiple batteries 20 are mounted in the accommodating space 50, each connection sheet 80 may be mounted and fixed on the positive terminal 202 and the negative terminal 203 of two adjacent batteries 20 through the opening 70 in the primary side beam 601. After all the connection sheets 80 have been mounted, the secondary side beam 602 is mounted and connected to the primary side beam 601. In this way, a process of connecting the positive terminals 202 and the negative terminals 203 of the batteries 20 by the connection sheets 80 is completed in the tray 10, so that the process is simple, and the assembly is simple. This solves the technical problems of a complex procedure and a difficult assembly that, when all the batteries 20 are welded through the connection sheets 80 into a whole to be clamped and lifted or placed upside down in the tray 10, the weld joints between the connection sheets 80 and the terminals (the positive terminals 202 and/or the negative terminals 203) are subjected to a force in the clamping process by a fixture, thereby adversely affecting quality control.

It may be understood that when the connection sheet 80 electrically connects the positive terminal 202 of one of the two adjacent batteries to the negative terminal 203 of the other one of the two adjacent batteries through welding, the welding is usually laser welding. In a laser welding process, no obstacle is allowed between a laser head and a welding area. However, the side beam 60 may hinder the laser welding. Therefore, the side beam 60 needs to be arranged into a split-type structure. The secondary side beam 602 at the front end needs to be designed to be detachably connected to the primary side beam 601. The batteries 20 are first mounted in the tray 10, and the connection sheets 80 are welded. Otherwise, the terminals (the positive terminals 202 and/or the negative terminals 203) and the connection sheets 80 need to be welded first outside the tray 10, and then the whole piece formed by the batteries 20 and the connection sheets 80 is mounted in the tray 10. As a result, the assembly is difficult. In addition, the weld joints of the connection sheets 80 are subjected to a force in a process of mounting the whole piece formed by the batteries 20 and the connection sheets 80 in the tray 10.

In addition, the access port 101a is arranged for the service of the distribution box 30 and also for the connections, such as welding between the terminals (the positive terminals 202 and/or the negative terminals 203) of the batteries 20 and the connection sheets 80. In this way, the access port 101a and the detachable connection between the secondary side beam 602 and the primary side beam 601 in the present disclosure may facilitate the connection between the terminals (the positive terminals 202 and/or the negative terminals 203) of the batteries 20 and the connection sheets 80.

In the present disclosure, through the arrangement of the side beam 60, the protection of the batteries 20 by the side beam 60 can be implemented to enhance the compression resistance of the tray 10. Through the detachable connection between the secondary side beam 602 and the primary side beam 601, both the connection between the positive terminals 202 and the connection sheets 80 and the connection between the negative terminals 203 and the connection sheets 80 may be completed in the tray 10, thereby improving the tooling quality of the battery pack 100, and preventing the side beam 60 from affecting the connecting procedure of the connection sheets 80 and the terminals (the positive terminals 202 and/or the negative terminals 203). It may be understood that if the connection sheet 80 electrically connects the positive terminal 202 and the negative terminal 203 of the two adjacent batteries 20 through welding, the detachable connection between the secondary side beam 602 and the primary side beam 601 prevents the secondary side beam 602 from affecting the welding procedure of the terminals (the positive terminals 202 and/or the negative terminals 203).

In an embodiment, an end portion of the primary side beam 601 and an end portion of the bottom plate 101 form the opening 70 together, and the secondary side beam 602 is detachably connected to the bottom plate 101. It may be understood that the opening 70 extends to the bottom plate 101. This increases the area of the opening 70. The opening 70 facilitates a process of connecting the positive terminals 202 and the negative terminals 203 of the batteries 20 by the connection sheets 80.

The primary side beam 601 includes a first side beam 603, a second side beam 604, and a third side beam 605. The first side beam 603 is arranged opposite to the second side beam 604. The third side beam 605 is arranged opposite to the secondary side beam 602. The first side beam 603 includes a first end 603a and a second end 603b arranged opposite to the first end 603a. The second side beam 604 includes a third end 604a and a fourth end 604b arranged opposite to the third end 604a. The bottom plate 101 includes a connection end 101b and a fixed end 101c arranged opposite to the connection end 101b. The first end 603a, the third end 604a, and the connection end 101b are arranged on the same side of the tray. The first end 603a, the third end 604a, and the connection end 101b form the opening 70. The secondary side beam 602 is detachably connected to all the first end 603a, the third end 604a, and the connection end 101b. The second end 603b, the fourth end 604b, and the fixed end 101c are arranged on the same side of the tray. The third side beam 605 is fixedly connected to the second end 603b, the fourth end 604b, and the fixed end 101c.

It may be understood that the first side beam 603, the third side beam 605, the second side beam 604, and the secondary side beam 602 are sequentially connected to form the side beam 60. The first side beam 603, the second side beam 604, the third side beam 605, and the bottom plate 101 may be integrally formed. When the battery pack 100 is a complete structure, the first side beam 603 may be a right long side beam of the side beam 60, the second side beam 604 may be a left long side beam of the side beam 60, the third side beam 605 may be a rear side beam of the side beam 60, the secondary side beam 602 may be a front side beam of the side beam 60, and the opening 70 is arranged at a front end of the tray 10.

In this way, in the present disclosure, through the arrangement of the first side beam 603, the third side beam 605, the second side beam 604, and the secondary side beam 602, the positive terminals 202 and/or the negative terminals 203 can be protected, and other parts of the batteries 20 can be protected, so that the overall protection of the batteries 20 is implemented.

The tray 10 further includes multiple interval side beams 90. The multiple interval side beams 90 are arranged at intervals in the accommodating space 50 to divide the accommodating space 50 into multiple subspaces. Some of the batteries 20 are arranged in one subspace. Through the arrangement of the interval side beams 90, the compression resistance of the tray 10 can be enhanced, thereby improving the structural stability of the battery pack 100. It may be understood that the first side beam 603, the second side beam 604, the third side beam 605, the bottom plate 101, and the interval side beams 90 may be integrally formed.

In an embodiment, the distribution box 30 is arranged between the batteries 20 and the secondary side beam 602. The distribution box 30 is connected to the batteries 20 by a connection wire. When the distribution box 30 is arranged between the batteries 20 and the secondary side beam 602, the length of the connection wire can be short, so that the cost is reduced, the circuit is simple, and the probability of a failure is low. It may be understood that the distribution box 30 is arranged at a front end of the battery pack 100.

The battery pack 100 further includes a structural adhesive 110. The structural adhesive 110 is arranged between the bottom plate 101 and the multiple batteries 20 to fixedly bond the multiple batteries 20 to the bottom plate 101. The structural adhesive 110 is used for bonding the batteries 20 to the bottom plate 101, to prevent the batteries 20 from moving in the battery pack 100.

The battery pack 100 further includes a direct cooling plate 120. The direct cooling plate 120 is arranged or disposed on the side beam 60 to cover the accommodating space 50. The direct cooling plate 120 is used for sealing the tray 10 and is used for leading out the heat generated by the batteries 20. The area in which the direct cooling plate 120 is pressed on the side beam 60 is sealed by a sealing foam or a sealing adhesive. Multiple curved cold flow channels 140 are provided in the direct cooling plate 120. The cold flow channels 140 are used for the flowing of a coolant to take away the heat generated by the batteries 20. A front-end interface of the direct cooling plate 120 is locked with a coolant exit and a coolant entrance by bolts.

The battery pack 100 further includes a thermally conductive structural adhesive 130. The thermally conductive structural adhesive 130 is arranged between the multiple batteries 20 and the direct cooling plate 120. The thermally conductive structural adhesive 130 is used for bonding and fixing the batteries 20 with the direct cooling plate 120, and is further used for transferring the heat generated by the batteries 20 to the direct cooling plate 120 to dissipate the heat through the direct cooling plate 120.

During the mounting of the battery pack 100, the multiple batteries 20 are first mounted in the accommodating space 50 of the tray 10. The multiple batteries 20 are arranged in an array. The positive terminal 202 and the negative terminal 203 of each battery 20 face the opening 70. The multiple batteries 20 and the bottom plate 101 of the tray 10 are bonded and fixed with each other by the structural adhesive 110. Next, the connection sheets 80 are mounted on the positive terminals 202 and the negative terminals 203. A laser welding head passes through the opening 70 of the tray 10 to weld the connection sheets 80 on the positive terminals 202 and the negative terminals 203. The distribution box 30 is mounted in the tray 10 through the access port 101*a*, and then the sealing plate 40 is mounted on the access port 101*a*. The secondary side beam 602 is mounted in the opening 70 of the tray 10. A sealing adhesive is used to fill a contact surface between the primary side beam 601 and the secondary side beam 602, which are fastened by a bolt. The thermally conductive structural adhesive 130 is applied on the top of the batteries 20. The direct cooling plate 120 is mounted on the top of the tray 10. The direct cooling plate 120 covers or seals the accommodating space 50. The area in which the direct cooling plate 120 is pressed on the side beam 60 of the tray 10 is sealed by the sealing foam (or a sealing adhesive). The front-end interface of the direct cooling plate 120 is locked with the coolant exit and the coolant entrance by bolts, and the assembly of the battery pack 100 is completed.

Figure 6:
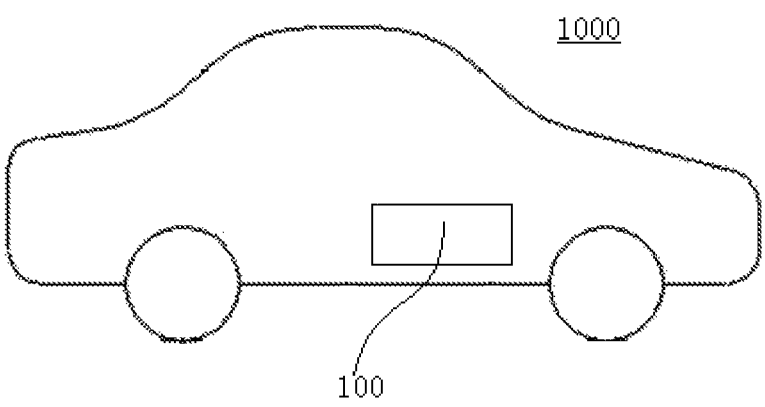
FIG. 6 is a schematic diagram of a vehicle according to an embodiment of the present disclosure.

As shown in FIG. 6, the present disclosure further provides a vehicle 1000 using the foregoing battery pack 100.

Although the embodiments of the present disclosure have been shown and described, persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A battery pack, comprising a tray, a plurality of batteries, a distribution box, a plurality of connection sheets, and a sealing plate, wherein the tray comprises an accommodating space, a bottom plate, and a side beam connected to the bottom plate to define the accommodating space, the side beam comprises a primary side beam comprising an opening, and the opening is in communication with the accommodating space, each of the batteries comprises a top surface that faces the opening, a positive terminal and a negative terminal are disposed at an interval on the top surface of each of the batteries, each of the connection sheets is disposed between two adjacent batteries for electrically connecting a positive terminal of a first one of the two adjacent batteries to a negative terminal of a second one of the two adjacent batteries, the batteries and the distribution box are disposed in the accommodating space, the batteries are electrically connected to the distribution box, an access port in communication with the accommodating space is provided on the bottom plate, the access port is disposed corresponding to the distribution box, the sealing plate covers the access port, and the sealing plate is detachably connected to the bottom plate.

2. The battery pack according to claim 1, wherein a height of the side beam is greater than or equal to a height of the batteries.

3. The battery pack according to claim 1, wherein the tray further comprises a secondary side beam, the secondary side beam covers the opening, and the secondary side beam is detachably connected to the primary side beam.

4. The battery pack according to claim 3, wherein an end portion of the primary side beam and an end portion of the bottom plate form the opening, and the secondary side beam is detachably connected to the bottom plate.

5. The battery pack according to claim 1, wherein the primary side beam comprises a first side beam, a second side beam, and a third side beam, the first side beam is disposed opposite to the second side beam, the third side beam is disposed opposite to a secondary side beam, the first side beam comprises a first end and a second end opposite to each other, the second side beam comprises a third end and a fourth end opposite to each other, and the bottom plate comprises a connection end and a fixed end opposite to each other, the first end, the third end, and the connection end are disposed on a first side of the tray and form the opening, and the secondary side beam is detachably connected to the first end, the third end, and the connection end, and the second end, the fourth end, and the fixed end are disposed on a second side of the tray, and the third side beam is fixedly connected to the second end, the fourth end, and the fixed end.

6. The battery pack according to claim 1, wherein the tray further comprises a plurality of interval side beams, the interval side beams are disposed at intervals in the accommodating space to divide the accommodating space into a plurality of subspaces, and at least one of the batteries is disposed in one of the subspaces.

7. The battery pack according to claim 1, further comprising a structural adhesive, wherein the structural adhesive is disposed between the bottom plate and the batteries to bond the batteries to the bottom plate.

8. The battery pack according to claim 2, further comprising a cooling plate disposed on the side beam to cover the tray; and a thermally conductive structural adhesive disposed between the batteries and the cooling plate.

9. A vehicle, comprising a vehicle body and a battery pack, wherein the battery pack comprises a tray, a plurality of batteries, a distribution box, a plurality of connection sheets, and a sealing plate, the tray comprises an accommodating space, a bottom plate, and a side beam connected to the bottom plate to define the accommodating space, the side beam comprises a primary side beam comprising an opening, and the opening is in communication with the accommodating space, each of the batteries comprises a top surface that faces the opening, a positive terminal and a negative terminal are disposed at an interval on the top surface of each of the batteries, each of the connection sheets is disposed between two adjacent batteries for electrically connecting a positive terminal of a first one of the two adjacent batteries to a negative terminal of a second one of the two adjacent batteries, the batteries and the distribution box are disposed in the accommodating space, the batteries are electrically connected to the distribution box, an access port in communication with the accommodating space is provided on the bottom plate, the access port is disposed opposite to the distribution box, the sealing plate covers the access port, and the sealing plate is detachably connected to the bottom plate; and an outer surface of the vehicle body comprises a first mounting position, and the battery pack is fixed in the first mounting position; and/or, an outer surface of a bottom of the vehicle body comprises a second mounting position, and the battery pack is fixed in the second mounting position.

10. The vehicle according to claim 9, wherein a height of the side beam is greater than or equal to a height of the batteries.

11. The vehicle according to claim 9, wherein the tray further comprises a secondary side beam, the secondary side beam covers the opening, and the secondary side beam is detachably connected to the primary side beam.

12. The vehicle according to claim 11, wherein an end portion of the primary side beam and an end portion of the bottom plate form the opening, and the secondary side beam is detachably connected to the bottom plate.

13. The vehicle according to claim 9, wherein the primary side beam comprises a first side beam, a second side beam, and a third side beam, the first side beam is disposed opposite to the second side beam, the third side beam is disposed opposite to a secondary side beam, the first side beam comprises a first end and a second end opposite to each other, the second side beam comprises a third end and a fourth end opposite to each other, and the bottom plate comprises a connection end and a fixed end opposite to each other, the first end, the third end, and the connection end are disposed on a first side of and form the opening, and the secondary side beam is detachably connected to the first end, the third end, and the connection end, and the second end, the fourth end, and the fixed end are disposed on a second side of, and the third side beam is fixedly connected to the second end, the fourth end, and the fixed end.

14. The vehicle according to claim 9, wherein the tray further comprises a plurality of interval side beams, the interval side beams are disposed at intervals in the accommodating space to divide the accommodating space into a plurality of subspaces, and at least one of the batteries is disposed in one of the subspaces.

15. The vehicle according to claim 9, wherein the battery pack comprises a structural adhesive, and the structural adhesive is disposed between the bottom plate and the batteries to bond the batteries to the bottom plate.

16. The vehicle according to claim 10, wherein the battery pack comprises a cooling plate disposed on the side beam to cover the tray; and a thermally conductive structural adhesive disposed between the batteries and the cooling plate.

* * * * *